United States Patent [19]

Ahmed

[11] Patent Number: 4,992,192

[45] Date of Patent: Feb. 12, 1991

[54] ELECTRORHEOLOGICAL FLUIDS

[75] Inventor: Syed M. Ahmed, Wilmington, Del.

[73] Assignee: Hercules Incorporated, Wilmington, Del.

[21] Appl. No.: 341,451

[22] Filed: Apr. 21, 1989

[51] Int. Cl.$^5$ .................... C10M 169/04; C09K 3/00
[52] U.S. Cl. ..................................... 252/73; 252/78.1;
    252/79; 252/572; 524/504; 524/533; 524/853;
    525/291; 525/285; 525/301; 525/308; 525/317
[58] Field of Search ................. 252/73, 7775, 76, 78.1,
    252/79, 572; 524/533, 504, 85 B; 525/301, 285,
    291, 308, 317

[56] References Cited

U.S. PATENT DOCUMENTS

| | | | |
|---|---|---|---|
| 3,047,507 | 7/1962 | Winslow | 252/75 |
| 3,367,872 | 2/1968 | Martinek et al. | 252/75 |
| 3,412,031 | 11/1968 | Martinek et al. | 252/75 |
| 3,950,284 | 4/1976 | Fukuda et al. | 524/461 |
| 4,033,892 | 7/1977 | Stangroom | 252/76 |
| 4,129,513 | 12/1978 | Stangroom | 252/78.1 |
| 4,315,085 | 2/1982 | Ozari et al. | 525/301 |
| 4,420,596 | 12/1983 | Lochhead et al. | 526/212 |
| 4,427,820 | 1/1984 | Backhouse et al. | 524/504 |
| 4,502,973 | 3/1985 | Stangroom | 252/73 |
| 4,533,695 | 8/1985 | Theodore et al. | 524/504 |
| 4,772,407 | 9/1988 | Carlson | 252/74 |

FOREIGN PATENT DOCUMENTS

| | | | |
|---|---|---|---|
| 63-97694 | 4/1988 | Japan . | |
| 1570234 | 7/1975 | United Kingdom | 33/02 |

*Primary Examiner*—Paul Lieberman
*Assistant Examiner*—Christine A. Skane
*Attorney, Agent, or Firm*—Joanne W. Patterson; Mark Goldberg

[57] ABSTRACT

Disclosed are electrorheological (ER) fluids which display improved stability against sedimentation, reduced current density and good ER responses. These ER fluids are prepared from monomers which are polymerized by dispersion polymerization in a low conductivity medium which also serves as the dispersion medium for the fluid. The ER fluids are further processed by modifying the polymer particles through polymerization of a hydrophilic monomer to form a hydrophilic shell or globule around the particles followed by neutralization through addition of an organic soluble base. The resulting dispersion is then doped with water to obtain a stable ER fluid. The hydrophilic shell or globule constitutes about 15% of the particle. Water dopant is only absorbed by the hydrophilic portion of the particle and does not enter into the core of the particle. The quantity of water is significantly reduced, which in turn results in a significant reduction of the current density at any given comparative voltage.

29 Claims, No Drawings

ELECTRORHEOLOGICAL FLUIDS

This invention relates to novel electrorheological fluids which display improved stability against sedimentation, reduced current densities, a low requirement for dopant and good electrorheological response.

This invention is particularly concerned with the polymerization of chosen monomers in a low conductivity medium which, in addition to serving as the polymerization medium, in some instances also serves as the dispersion medium for the electrorheological fluid. In other instances the monomer may first be dispersion polymerized to the desired particle size, recovered from the polymerization medium, and then dispersed in the dispersion medium. In the instant invention the surface of the polymer particles is hydrophilically modified and then neutralized through the addition of a neutralizing agent, followed by addition of dopant. In prior art fluids the monomers are first polymerized, then ground to the desired size and doped, and finally dispersed in a liquid medium. This invention eliminates the grinding step and offers better control over polymer particle size and particle size distributions in a low conductivity medium.

Electrorheological (ER) fluids have been known for some time to be colloidal dispersions of polymeric particles in a low conductivity continuous medium which show dramatic changes in flow properties when exposed to an electric field. These fluids have been known by a number of other names including electrofluids, electroviscous fluids, electroresponsive fluids, electrorestrictive fluids and jammy fluids. Fluids exhibiting these properties were first referred to as "electroviscous" because of their apparent viscosity changes in the presence of electric fields. Such compositions are now more commonly referred to as "electrorheological" fluids since such properties are better understood in terms of the total rheology of the fluids.

These fluids respond to the influence of an electric potential by showing a very rapid and pronounced increase in bulk viscosity. This phenomenon can appear as an increase in apparent viscosity of several or more orders of magnitude. The phenomenon is generally completely reversible, with the compositions reverting to their initial (zero-field) viscosity upon removal of the electric field. ER fluids change their characteristics very rapidly when electric fields are applied or released with typical response times being on the order of milliseconds. The ability of ER fluids to respond rapidly to electrical signals allows devices using ER fluids to replace standard electromechanical elements. This greatly expands the number of repetitions a mechanical device can perform. Therefore, ER fluids offer important advantages in a variety of mechanical systems, particularly those which require a rapid response interface between electronic controls and mechanical devices.

One common application of such fluids is in electromechanical clutches in which the fluid is disposed between the surfaces of two electrically conductive members and an electric potential is applied across the two members. The fluid responds to the application of the electric potential by instantaneously, but reversibly, changing in apparent bulk viscosity and yield stress. In strong fields, the fluid thickens to a solid or semi-solid condition whereby torque can be transmitted between the surfaces of the clutch members. Other applications in which ER fluids can be used include fluid filled engine mounts, high speed valves with no moving parts and active dampers for vibration control among others, and the interface between electronic and mechanical parts of a machine.

Typically, an ER fluid consists of four components: vehicle, particulate, polar liquid, and stabilizer(s). The particulate material and polar liquid constitute the dispersed phase of the system, with the vehicle being the continuous phase. Each of the four components mentioned above can be one material or a mixture of more than one material.

The continuous phase or vehicle is usually a nonpolar, insulating liquid with a low dielectric constant. Mineral oil, silicone oil and various aliphatic hydrocarbons are good examples of such liquids. The viscosity and the density of the vehicle play an important role in the performance of ER fluids. Stability and zero-field viscosity of ER fluids are highly dependent on these factors.

A variety of materials including starch, silica-gel, and hydrophilic synthetic polymers have been found to be useful as fine dispersed particles, which typically contain adsorbed water and surfactant suspended in a nonpolar dielectric fluid having a permittivity less than that of the particle and a high breakdown strength. Conductivity, permittivity, particle size, and hydrophilicity of the particulate material are variables that may affect the performance of an ER fluid.

The polar liquid component is usually water, however, it may be an alcohol or another liquid. The polar liquid has been described as functioning to make the surface of the particles overly wet and sticky, under the applied electric force to facilitate bridging. It has also been described as facilitating polarization of the particles under the applied potential to create strong attractive forces between the particles.

Suspension stabilizers such as surface active agents or surfactants are often used to prevent the particles from coagulating or settling, or to increase the ER response of the fluid, or both. Some researchers reported that stabilizing materials adversely affected electrorheological response, however.

Prior to the instant invention, ER fluids have been made from bulk polymers which were initially pulverized into particles, followed by addition of a polar liquid. These particles were then dispersed in the desired continuous phase liquid which contained stabilizers or surfactants, if desired. This process of making ER fluids is cumbersome and has some inherent disadvantages including difficulty in obtaining particles of the desired size to prepare stable dispersions. Particle sedimentation is a major difficulty which has only been partially resolved in the prior art by matching the density of the particles with the density of the dispersion medium. However, the particles do not generally remain dispersed over a wide range in temperature. Usually, the density of the medium is more sensitive to changes in temperature than is the density of the dispersed polymer, and consequently, phase separation occurs with a change in temperature.

The density matching approach is shown in several patents issued to Stangroom, including U.S. Pat. Nos. 4,033,892; 4,129,513 and 4,502,973 and British Patent No. 1,570,234, dated June 25, 1980. The basic characteristics of the polymers as particulate materials for ER fluids defined in the Stangroom patents include the following: Particles that are hydrophilic, sufficiently porous to be capable of adsorbing a certain amount of water, and containing ionizable groups enabling the water to acquire an electric charge. In Stangroom's most recent patent cited herein, the polymer was defined by its water absorbency and its density. Stangroom found it to be advantageous to avoid use of particles of polymer which were less than 1 micron in size as it was believed that the smaller size would lead to undesirable zero-field properties in a fluid. Since his approach for making stable ER fluids was to match the density of the dispersed phase with that of the continuous phase, the main criterion used in selection of a continuous phase was density. For this reason, not only single component continuous phases, but also blends of selected liquids were used. It was emphasized that the density matching should be done at the use temperature to avoid instability of the fluids.

This invention addresses many of the disadvantages found in the prior art ER fluids. The size reduction step is not necessary and there is no longer a problem with particle sedimentation. It is not necessary to match the density of the polymer to that of the dispersion medium to obtain electrorheological fluids of excellent stability. The prior art polymeric particles reported to give good ER response are generally hydrophilic polymers. This invention introduces a new concept of hydrophobic-hydrophilic polymeric particles which have been treated with a neutralizing agent. The bulk of the particle consists of hydrophobic polymers with a relatively minor amount of hydrophilic polymer forming a shell or globule covering the hydrophobic polymer core of the particle. The amount of water required as a dopant for prior art hydrophilic polymer particles is much greater than that required by the hydrophobic-hydrophilic polymer particles of this invention. The higher the amount of water in an ER fluid, the higher are the current densities.

Consequently, this invention provides a method of producing a stable electrorheological fluid that requires a minimum quantity of water as dopant, thus significantly reducing the current densities. In the prior art, polymers used as particles in an ER fluid system are generally made by a polymerization process and recovered as bulk polymer rather than in the fine particle form. The dispersion polymerization process, which results in a dispersion of finely divided spherical polymer particles, has not been used for making ER fluids, mainly because the hydrophilic monomers are not usually soluble in the desired continuous medium. A solution for these problems is provided by this invention.

SUMMARY OF THE INVENTION

Electrorheological fluids of novel composition have been prepared having improved stability against sedimentation, reduced current density, and good ER response. These fluids consist of dispersions of polymeric particles in dielectric media. The particles are first formed by polymerization in the desired media with a polymer present to act as a steric stabilizer. The resulting polymeric particles are usually less than 1 micron in diameter, however, particles ranging from about 0.1 micron to 10 microns and more in diameter can be made using this process. Typical particles sizes are in the range of 0.5 to 0.8 micron in diameter. ER fluids prepared in this manner eliminate the problems associated with polymer recovery, drying and subsequent grinding of prior art procedures. The polymeric particles of these ER fluids are then hydrophilically modified by polymerization of a hydrophilic monomer, such as acrylic acid, to form a hydrophilic shell or globule at the particle medium interface. The hydrophilic shell or globule constitutes about 15% of the particle. Water dopant is only absorbed by the hydrophilic portion of the particle and does not enter into the core of the particle. The quantity of water required is significantly reduced, which in turn results in a significant reduction of the current density at a given applied electrical field. Further improvement in the ER response is possible through the neutralization of the acid groups of the hydrophilic polymer by addition of a neutralizing agent followed by addition of the water dopant. Optimal properties are obtained by adjusting the level of polymer in the vehicle and by substituting a lower viscosity continuous phase fluid for the higher viscosity medium used during polymerization.

DETAILED DESCRIPTION OF THE INVENTION

The polymerizations of the monomers of this invention are of the type known as dispersion polymerizations wherein the monomer(s) are completely soluble in the polymerization medium but the resulting polymers are not. The initial reaction mixture is, therefore, homogeneous. The essential components in this process include the monomer, the initiator, the continuous phase medium and a stabilizer. Crosslinking agents will usually be present since a crosslinked core polymer particle requires less hydrophilic material to be added to the core polymer particle.

Among the monomers which may be polymerized to form the hydrophobic core of the particles dispersed in the medium are acrylates such as ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, and n-hexyl methacrylate. Representative higher alkyl acrylic esters are decyl acrylate, isodecyl methacrylate, lauryl acrylate, stearyl acrylate, behenyl acrylate and myristyl acrylate and the corresponding methacrylates. Mixtures of two or three or more long chain acrylic esters may be successfully polymerized with one of the carboxylic monomers. One typical useful class of copolymers is the methacrylates where the alkyl group contains 10 to 18 carbon atoms. Other monomers which can be used include styrene, alpha-methyl styrene, vinyl toluene, vinyl acetates, vinyl chlorides and acrylonitriles.

The polymers also may be cross-linked with a polyfunctional vinylidene monomer containing at least two terminal $CH_2$ groups, including for example, butadiene, isoprene, divinyl benzene, divinyl naphthalene, acrylates and the like. When the optional cross-linking agent is present, the polymeric mixtures usually contain up to about 5 or more percent by weight of cross-linking monomer based on the total monomer present, and more preferably, about 0.1 to 2.0 weight percent.

The hydrophilic monomers which are polymerized to form a hydrophilic shell or globule around the hydrophobic polymer particles are selected from the carboxyl-containing or the sulfate or sulfonate-containing monomers. The carboxyl-containing monomers include acrylic acid, methacrylic acid, itaconic acid, aconitic acid, fumaric acid, and maleic acid. The sulfonate-containing monomers include 2-sulfoethyl acrylate, 2-sulfoethyl methacrylate, p-vinylbenzene sulfonate, vinylbenzyl sulfonate, vinyl toluene sulfonate, and vinyl sulfonate.

The organic liquid used both for polymerization and as the vehicle for the ER fluid in most of the examples herein is mineral oil, a colorless, petroleum liquid product, normally containing a major proportion of liquid aliphatic hydrocarbon materials. The continuous liquid phase can be selected from any one of a large number of electrically insulating hydrophobic liquids in which the monomer selected dissolves. These include transformer oils, silicone oils, mineral oils, transformer insulating fluids, aliphatic hydrocarbons such as paraffin oils, halogenated aromatic liquids and halogenated paraffins. As known to those familiar with such compounds, transformer oils refer to those liquids having characteristic properties of both electrical and thermal insulation. Naturally occurring transformer oils include refined mineral oils which have low viscosity and high chemical stability.

The composition of the liquid phase may be modified after polymerization by dilution with the liquid used in polymerization or with other suitable compatible insulating hydrophobic liquids. This allows rheological and electrical properties of the final fluid to be adjusted.

The specific gravity of the mineral oil, used in the examples herein, normally ranges from about 0.76 to about 0.79, with a boiling range from about 150° C. to about 200° C. While the flash point is normally above about 40° C., for safety reasons the flash point should preferably be above about 60° C. A mineral oil having a composition of 0 to less than 5 percent aromatics, about 40 to about 80 percent paraffins and about 15 to about 60 percent naphtha, having a flash point above 60° C. produces good results. The amount of mineral oil used will normally be in excess of the amount of the monomers to be polymerized and while the proportion may vary from at least 1 weight percent of monomers and 99 weight percent mineral oil, up to about 50 weight percent monomers and 50 weight percent mineral oil, and more normally a concentration of about 15 to 40 weight percent monomers is employed. More preferably, about 15 to 25 weight percent monomers is used. In the examples that follow the mineral oil had a room temperature viscosity of 90 cp, a density of 0.87 gm/cc and a dielectric constant at 1 kHz of 1.8.

Dispersions in organic media are inherently less stable than those in aqueous systems, thus requiring a stabilizer. The attractive interaction between the particles leads to their rapid coagulation unless a repulsive steric barrier is established at the interface between particles. In preferred embodiments of the invention, polymeric stabilizers are used for this purpose. Various types of polymeric stabilizers may be employed including homopolymers, and copolymers including random copolymers, and block copolymers and graft copolymers having one segment being soluble in the polymerization medium and the other segment having an affinity towards the dispersed phase polymer. Comonomeric surfactants that are soluble in the selected continuous phase for the polymerization can also be used. Selection of stabilizers depends upon the nature of the polymer being formed and the medium of the polymerization. Block copolymers are molecules in which two different types of homopolymer chains are joined end to end. While any number of homopolymer blocks can be joined together, typically only one block of each homopolymer is involved. In the case of a block copolymer stabilizer, one block forms an anchor group segment which is nominally insoluble in the fluid media and attaches to the particle surface. The other block, which is soluble in the fluid, will generally be very long and provides the steric stabilization barrier. Graft copolymers are somewhat different. A long polymeric backbone is formed by one of the homopolymers with side chains of the other homopolymer attached at intervals along its length to form a comb-like copolymer structure. In this case the polymer backbone would form the anchor for attaching the molecule to the particle and the side chains would be solvated by the fluid medium.

In some systems a homopolymer may serve as a steric stabilizer. A suitable homopolymer is essentially soluble in the fluid but has some functionality with strong affinity for the particle surface. Similarly, a random copolymer can also be used as a steric stabilizer. Typical polymers that can be used as stabilizers include homopolymers such as poly(methyl methacrylate) (PMMA), poly(vinyl acetate) (PVA), poly(12-hydroxystearic acid) (PSA) or poly(lauryl methacrylate) (PLM). The following graft or block copolymers can be employed when the dispersion polymer is poly(methyl methacrylate) or polystyrene: PMMA/PSA, PVA/PSA, PMMA/PLM or styrene-butadiene copolymer. When the dispersion polymer is poly(vinyl acetate), the stabilizing block or graft copolymer may be PVA/PSA or PMMA/PSA.

It has been well established that the particle size and particle size distribution of the polymeric particles produced by dispersion polymerization can be controlled by varying several factors such as monomer, initiator and stabilizer concentrations. Solvency of the polymerization medium and polymerization temperature also have a strong effect on the particle size and the particle size distribution of the resulting polymeric dispersions. It is also known that, for the polymers which are soluble in their own monomers, the unreacted monomer keeps the growing radicals in the solution for a much longer period compared to those monomers which do not act as a solvent for the resulting polymers. In such systems, monomer concentration is reported to be very important, not only for the particle size, but also for the stability of the resulting dispersions.

It has also been demonstrated in the present invention that the particle size obtained by this type of polymerization can be controlled from submicron to 10–15 microns in diameter. However, from a stability point of view, smaller size particles are more desirable. The rate of sedimentation of the dispersed phase particles can be calculated using Stokes' law which shows that the stability against sedimentation is directly dependent upon the square of the particle diameter and the density difference between the particles and the medium and inversely dependent upon the viscosity of the medium. The organic medium used for polymerization is usually not as dense as the dispersed phase polymer, and generally has a lower viscosity. Therefore, the particle size must be smaller to minimize sedimentation during storage.

The following procedure was followed (except when otherwise indicated) in measuring the response of ER fluids produced according to this invention. A Rheometrics System 4 Rheometer (Rheometrics Inc., Piscataway, N.J.) was modified to facilitate the application of an applied electric field and was found to be a quick and reliable way of measuring the response of ER fluids. Accordingly, the fluid option assembly of the Rheometer was modified to facilitate test sample was held between two coaxial cylinders (the cup and bob) having a total surface area of 82.9 cm$^2$. The bob has a radius of 24 mm and is 55 mm in length and is attached to the sensitive transducer which can measure a maximum torque of 100 gm-cm. The cup has an inner radius of 26 mm allowing the 2 mm gap. It is held by a motor that can perform both rotational and oscillatory motions. The electric potential is introduced into the bob by way of a brush device. The torque measurement is not attenuated by the incorporation of the voltage device. An insulator is placed between the transducer shaft and the electrified bob to shield the transducer electronics from the high voltage. The motor shaft and the cup are grounded. A Fluke voltage generator is used as the high voltage source capable of generating a maximum voltage of 10,000 V, DC. Ammeters are used to detect the current. A shield is placed in front of the rheometer to screen high voltage from the operator during a normal run. A standard ER test is the voltage screen experiment. The ER fluid is subjected to oscillatory shear flow at 5 rad/sec and 15% strain initially for 5 minutes. Then a voltage is turned on while the fluid is being sheared. After 15 minutes (or a shorter time, e.g. 2–5 minutes), the voltage is turned off for another 5 minutes or a shorter time. This process is repeated up to a limit of 2000 V, with the voltage increased in each repetition in equal increments such as 250 or 500 volts. Also it is specified that experiments be discontinued if a maximum of 2500 micro Amps is drawn by the fluid. In the Tables, included herein, Electric Field is expressed in units of Kilovolts per millimeter (KV/mm). The changes in the complex viscosity, storage modulus G' and the loss modulus G" were recorded for the electric fields of varying strength. In the tables the viscosity is expressed in units of poise. Generally, the magnitude of the ER effect increased with increasing field strength.

The ER experiments can be done at different temperatures. Below room temperature, the temperature control bath is used with the coolant being isopropyl alcohol. An external thermocouple probe immersed as close to the cup as possible is used to monitor the ER fluid temperature. For high temperatures, a Haake bath with silicone oil is used.

Changes in complex viscosity, storage modulus G' and loss modulus G", were studied as a function of applied field strength. As expected, the magnitude of the ER effect (change in the complex viscosity) increases with increasing field strength. The fluid behaves like a liquid in the unenergized state. With increased electric field strength the ER fluid goes through a transformation from a viscoelastic to an elastic solid-like material. Upon removal of the applied potential, the fluid resumes its original liquid behavior.

The first step in preparing the ER fluid is to synthesize the hydrophobic polymer particles, e.g. polymethylmethacrylate (PMMA) or polystyrene (PS), by the dispersion polymerization method according to the procedure in Example 1. The hydrophobic polymeric particles produced according to Example 1 cannot be doped with water. However, these particles can be further processed to render their surfaces hydrophilic, which allows them to be doped with water, making the dispersion electrically active. For example, a dispersion of polymethylmethacrylate (PMMA) particles in mineral oil can be surface carboxylated by polymerizing acrylic acid at the particle surface. The resulting dispersions when doped with water show good ER response. According to another aspect of this invention the response can be further improved by neutralization of the acid groups to salts.

This novel method of making ER fluids not only resolves the stability problems but also results in a novel composition of the polymeric particles with added advantages. The bulk (about 85%) of each of the particles formed by this method consists of hydrophobic polymer. Only in interface regions is the hydrophilic polymer found. These polymers require a much lower amount of the water dopant than particles consisting of 100% hydrophilic polymer. As a result of this decreased demand for dopant, the current densities of these new fluids are much less than the fluids made by conventional methods. Most of the experimental results shown in the examples concerns the polymerization of acrylic acid onto the PMMA particle surface. However, this concept is applicable to polymeric shells or globules formed from other hydrophilic monomers such as methacrylic acid, 2-sulfoethyl methacrylate and the others listed previously. The solubility of the hydrophilic monomer in the continuous phase and that of the hydrophobic polymer in the monomer being added and polymerized (hydrophilic monomer) will determine the selection of such monomers. Those skilled in the art will be able to determine the appropriate hydrophilic monomer.

The process of hydrophilic modification of PMMA particles can be carried out in several ways. The seed particles can be crosslinked or non-crosslinked particles. The addition of monomer and the polymerization can be carried out under equilibrium conditions or under monomer starved conditions. Another necessary consideration is the compatibility of the resulting hydrophilic polymer with that of the seed hydrophobic polymer. In most of the experimental work conducted in connection with the instant invention, required amounts of acrylic acid containing initiator (benzoyl peroxide) and crosslinking agent were fed to the PMMA dispersion maintained in an inert atmosphere at the polymerization temperature (80° C.) over a one hour period.

Other methods such as addition of all of the acrylic acid, initiator and crosslinking agent at once, or addition of monomer containing initiator and crosslinking agent at room temperature to the PMMA dispersion and allowing the monomer to equilibrate over a long period of time followed by polymerization also produced favorable results. When using crosslinked PMMA particles, the method of addition did not make much difference in the performance of the resulting fluids. However, with non-crosslinked particles results differed. Monomer starved conditions are the preferred choice of monomer addition with the non-crosslinked particles.

Improvement in the ER response was achieved by addition of stoichiometric amounts of a neutralizing agent, thereby changing the surface acid groups into salts. Various organic soluble bases or mixtures thereof may be employed as the neutralizing agent such as metal alkyls and metal aryls of lithium, aluminum, zinc, magnesium, boron, sodium, and potassium; alkoxides such as lithium tertbutoxide, potassium tertbutoxide, sodium 2-ethyl hexoxide, amines such as octadecyl amine, 2-ethyl hexylamine and pyridine and compounds such as dialkyl magnesium, benzyl trimethyl ammonium hydroxide and tetrabutyl ammonium hydroxide. Other neutralizing agents as may be known to one skilled in the art may also be employed.

In the examples set forth herein, butyl lithium (10M) was added to thoroughly argon sparged PMMA-PAA electrorheological fluid followed by the addition of a polar liquid (dopant). Since this neutralization reaction is exothermic, care must be taken, both in carrying out the reaction, and in handling the butyl lithium (a pyrophoric material). All the transfers of the material should be carried out in an argon atmosphere. Use of butyl lithium should also be restricted to non-halogenated polymers and non-halogenated continuous phase liquids. However, the resulting product, after the reactions with butyl lithium, can be diluted with halogenated hydrocarbons.

The PMMA-LiPAA [poly(methyl methacrylate)-lithiated poly(acrylic acid)] based ER fluids described above have zero field viscosities which are considered to be at the higher end of the desired range. In order to lower the zero-field viscosity, two different approaches were taken. The first approach in reducing the viscosity (Example 9 and 10) was to dilute the ER fluids containing about 22% dispersed phase polymer with a suitable low viscosity liquid having electrical properties similar to those of a mineral oil and having complete miscibility with mineral oil resulting in a lower solids level. The second approach (Example 11-13) was to carry out the polymerization steps in a lower viscosity continuous medium such as Isopar M; a 1:1 mixture of mineral oil and Isopar M; or a mixture of mineral oil and silicone oil (Isopar M is a an aliphatic hydrocarbon which is an odorless liquid that is a higher boiling fraction than kerosene.)

EXAMPLE 1

Dispersion Polymerization of Methylmethacrylate

Dispersion polymerization of methylmethacrylate (MMA) in mineral oil was carried out using the ingredients shown in Table 1. This monomer is completely soluble in mineral oil and the resulting polymer is insoluble in this medium. In a typical experiment the stabilizer is first dissolved in mineral oil and charged to a jacketed glass rector equipped with a stirrer, thermometer, condenser and nitrogen sparging tube and heated to the polymerization temperature (80° C.) while sparging with nitrogen. In a separate beaker, initiator and crosslinking agent (if desired) are added and dissolved in the monomer and then charged to the reactor held at the polymerization temperature. The monomer is then allowed to polymerize for about 16 hours. Addition of cold monomer to the mineral oil mixture brings the temperature down to about 65° C. Once the temperature of the reaction mixture returns to 80° C. in about 5 minutes after addition of monomer, a strong exotherm occurs and the monomer polymerizes adiabatically for a short time with temperatures reaching as high as 140° C. for several minutes. The polymerization reaction is then continued for several hours at 80° C. The exothermic rise in temperature can also be controlled by cooling the liquid if desired. The conversion to polymer at the end of the exotherm is usually greater than 95% and at the end of the run is usually greater than 99.5%. The time for reaching the end product can be shortened by adding additional initiator at the end of the exotherm. The whole process is usually completed within two hours.

The particle size of the dispersions prepared using the ingredients shown in Table 1 is usually in the range of about 0.5–0.8 micron, with a relatively narrow distribution of particle size.

TABLE 1

| Polymerization Recipe | | Parts/100 |
|---|---|---|
| Mineral Oil = | 261 gms (300 ml) | 55.3 |
| Stabilizer Acryloid 956* = | 20 gms | 4.3 |
| Methylmethacrylate Monomer = | 187 gms (200 ml) | 39.7 |
| Benzoyl Peroxide = | 2.5 gms | 0.5 |
| TEGDMA** = | 1.1 gms | 0.2 |
| Total | 471.6 | 100.0 |

*Produced by Rohm and Haas
**Triethylene glycol dimethacrylate (crosslinking agent)

EXAMPLE 1A

The polymethyl methacrylate dispersions described in Example b 1 were used at starting hydrophobic seed particles. These polymers were crosslinked using triethylene glycol dimethacrylate (TEGDMA) crosslinking agent. Acrylic acid (AA) was polymerized onto the hydrophobic polymer particles to form a hydrophilic shell or globule around said particles. The desired amount of acrylic acid containing dissolved benzoyl peroxide initiator and crosslinking agent (if desired) was fed to the PMMA dispersion maintaining in an inert atmosphere at the polymerization temperature of 80° C., over a one hour period. This process produced polymer particles having a PMMA core which was hydrophobic and a polyacrylic acid (PAA) shell or globule which was hydrophilic. A typical recipe is given in Table 1A.

TABLE 1A

| PMMA dispersion of Example 1 | 250 grams |
|---|---|
| Mineral oil | 250 grams |
| Acrylic acid | 15.75 grams (15 ml) |
| Benzoyl peroxide | 0.30 grams |
| TEGDMA | 0.10 grams |
| Total | 516.15 grams |

EXAMPLE 1B

The surface acid groups of PMMA-PAA particles prepared in Example 1A are neutralized using stoichiometric amounts of butyl lithium. In a typical laboratory run, 300 grams of PMMA-PAA dispersion of Example 1A is reacted with 12.75 ml of 10 Molar butyl lithium. As mentioned previously, this reaction is carried out under an argon atmosphere. The reaction changes the COOH groups to COO$^-$ Li$^+$ groups and produces butane as the byproduct. The ER fluids are doped through addition of water while stirring. Unless otherwise stated the ER fluids in the following examples contain 1% water.

The neutralized PMMA-PAA fluids of this invention provide complete reversibility of the ER response. Unneutralized PMMA-PAA fluids which had been exposed to an applied field did not return to the same zerofield viscosity on termination of the field. However, higher shear rates or longer waiting periods did help in bringing the viscosities of unneutralized fluids back to the original zerofield viscosity.

EXAMPLES 2 to 9

Table 2 shows the performance of the neutralized PMMA-LiPAA based ER fluids doped with water at field strengths from 0.0 to 1.0 KV/mm. Table 3 shows the effect of temperature on the performance of PMMA-LiPAA based ER fluids. In Table 4 the current density versus the temperature is shown. Table 5 shows the effect of heat treatment of the ER fluids on the performance of these fluids. Table 6 shows the effect of varying the method of addition of acrylic acid on the performance of the ER fluids. In Table 7 the performance of the ER fluids with various dopants is shown and in Table 8 the effect of changing the concentration of the water dopant at higher field strengths is shown. These data are obtained on the Rheometrics Mechanical Spectrometer (RMS) which is equipped with a transducer which can measure a maximum torque of 2000 gm-cm.

TABLE 2

Performance of PMMA-LiPAA Based ER Fluids

| Example No. | Field Strength KV/mm | Viscosity (Poise) | | | | |
|---|---|---|---|---|---|---|
| | | 0.0 | 0.25 | 0.5 | 0.75 | 1.0 |
| 2A | | 8.3 | 60 | 235 | 480 | 630 |
| 2B | | 8.9 | 78 | 274 | 511 | — |
| 2C | | 7.8 | 80 | 256 | 430 | overload |
| 2D | | 8.1 | 53 | 172 | 352 | 515 |
| 2E | | 8.4 | 51 | 177 | 370 | 558 |
| 2F | | 9.3 | 80 | 280 | 580 | overload |
| 2G | | 4.3 | 45 | 148 | 285 | 420 |
| 2H | | 5.5 | 37 | 135 | 250 | 360 |
| 2I | | 8.2 | 34 | 126 | 257 | 380 |
| 2J | | 4.1 | | 130 | | 430 |

Fluid Composition
PMMA = 19.2
LiPAA = 3.3
$H_2O$ = 1.0
Rest = 76.5

TABLE 3

Effect of Temperature on Performance of PMMA-LiPAA Based ER Fluids

| Example No. | Temperature | Field Strength KV/mm | Viscosity (Poise) | | | | |
|---|---|---|---|---|---|---|---|
| | | | 0.0 | 0.25 | 0.5 | 0.75 | 1.0 |
| 3A | −25° C. | | 328 | 731 | 1067 | — | — |
| 3B | 0° C. | | 45 | 190 | 554 | 1212 | 1198 |
| 3C | 15° C. | | 25 | 120 | 610 | 1200 | 1230 |
| 3D | 25° C. | | 7.8 | 54 | 265 | 525 | — |
| 3E | 40° C. | | 6.8 | 58 | 304 | 534 | — |
| 3F | 60° C. | | 5.2 | 78 | 298 | 318 | — |
| 3G | 80° C. | | 4.5 | 97 | 221 | 256 | 275 |
| 3H | 100° C. | | 3.1 | 79 | 128 | 139 | 154 |

Fluid Composition
PMMA = 19.2
LiPAA = 3.3
$H_2O$ = 1.0
Rest = 76.5

TABLE 4

Performance of PMMA-LiPAA Based ER Fluids Current Density vs Temp.

| Example No. | Temperature °C. | Field Strength KV/mm | Current Density (uA/sq. cm.) | | | |
|---|---|---|---|---|---|---|
| | | | 0.25 | 0.5 | 0.75 | 1.0 |
| 4A | 15° C. | | 0.00025 | 0.006 | 0.042 | 0.1 |
| 4B | 25° C. | | 0.0006 | 0.04 | 0.25 | — |
| 4C | 40° C. | | 0.0024 | 0.29 | 2.2 | — |
| 4D | 60° C. | | 0.13 | 7.16 | 28.25 | — |
| 4E | 80° C. | | 6.2 | 36.75 | 90.0 | 150 |
| 4F | 100° C. | | 18.6 | 56.25 | 91.2 | 114 |

Fluid Composition
PMMA = 19.2
LiPAA = 3.3
$H_2O$ = 1.0
Rest = 76.5

TABLE 5

Effect of Heat Treatment on the Performance of PMMA-LiPAA Fluid

| Example No. | Heat Treatment | Field Strength KV/mm | Viscosity (Poise) at room temperature | | | | | |
|---|---|---|---|---|---|---|---|---|
| | | | 0.0 | 0.125 | 0.25 | 0.50 | 0.75 | 1.0 |
| 5A | None | | 4.7 | 16 | 45 | 148 | 285 | 420 |
| 5B | 2 hrs. at 120° C. | | 5.3 | 27 | — | 230 | 380 | 520 |
| 5C | 8 hrs. at 120° C. | | 5.4 | 23 | 64 | 178 | 292 | 400 |
| 5D | 16 hrs. at 120° C. | | 5.1 | 18 | 50 | 155 | 273 | 380 |

Fluid Composition
PMMA = 19.2
LiPAA = 3.3
$H_2O$ = 1.0
Rest = 76.5

TABLE 6

Performance of PMMA-LiPAA Based ER Fluids
Effect of Method of Acrylic Acid Polymerization

| Example No. | Method of Addition | Field Strength KV/mm | Viscosity (Poise) | | | | |
|---|---|---|---|---|---|---|---|
| | | | 0 | 0.25 | 0.50 | 0.75 | 1.0 |
| 6A | Addition over one hour | | 8.4 | 51 | 177 | 370 | 558 |
| 6B | Addition over two hours | | 8.5 | 42 | 142 | 301 | 499 |
| 6C | Addition at 80° C. in one short | | 9.8 | 40 | 131 | 254 | 411 |
| 6D | AA added several hours before polymerization at RT | | 9.5 | 46 | 167 | 350 | 526 |
| 6E | AA added several hours before polymerization at RT | | 8.1 | 53 | 172 | 353 | 516 |

Fluid Composition
PMMA = 19.2
LiPAA = 3.3
$H_2O$ = 1.0
Rest = 76.5

TABLE 7

Performance of PMMA-LiPAA Based ER Fluids With Various Dopants

| Example No. | Fluid Composition %. | | | | | Viscosity (Poise) | | | | |
|---|---|---|---|---|---|---|---|---|---|---|
| | PMMA | Li PAA | Dopant | Rest | Dopant | KV/mm 0 | 0.25 | 0.5 | 0.75 | 1.0 |
| 7A | 19.2 | 3.3 | 1 | 76.5 | $H_2O$ | 7.2 | 68 | 297 | 910 | — |
| 7B | 19.2 | 3.3 | 1 | 76.5 | DMSO | 4.6 | 6.5 | 6.5 | 6.5 | 6.2 |
| 7C | 19.2 | 3.3 | 1 | 76.5 | MFA | 21.2 | 25 | 23 | 33 | 22 |
| 7D | 19.2 | 3.3 | 1 | 76.5 | EG | 63 | 52 | 37 | 37 | 42 |
| 7E | 19.2 | 3.3 | 1 | 76.5 | ETOH | 5.4 | 8.3 | 7.9 | 7.9 | 7.3 |

DMSO is dimethyl sulfoxide
MFA is Methyl formamide
EG is ethylene glycol
ETOH is ethyl alcohol

TABLE 8

Performance of PMMA-LiPAA Based ER Fluids
Effects of Dopant (water) on ER Effect
(RMS)

| Example No. | Fluid Composition %. | | | | Field Strength KV/mm | Viscosity (Poise) | | | | | |
|---|---|---|---|---|---|---|---|---|---|---|---|
| | PMMA | Li PAA | $H_2O$ | Rest | | 0 | 0.5 | 1.0 | 1.5 | 2.0 | 2.5 | 3.0 |
| 8A | 19.2 | 3.3 | 0.5 | 77 | | 5.5 | 60–10 | 178–13 | 160–14 | 237–20 | 253–350 | — |
| 8B | 19.2 | 3.3 | 0.75 | 76.75 | | 5.0 | 82 | 265 | 485 | 740 | 960 (300) | — |
| 8C | 19.2 | 3.3 | 1.0 | 76.5 | | 4.1 | 130 | 437 | 836 | 1290 | 1810 | 2320 |
| 8D | 19.0 | 3.3 | 1.5 | 76.2 | | 5.6 | 197 | 670 | — | — | — | — |

Table 2 shows the consistency of performance of PMMA-LiPAA fluids prepared according to the same formulation over a period of more than a year. There is a reasonably good correlation between the different runs. On average a typical fluid with about 22% solids shows a 70 to 100 fold increase in viscosity at an applied DC field strength of 1 KV/mm, a 300 fold increase at 2 KV/mm and 600 fold at 3 KV/mm as shown in Table 8. In all of these examples the weight percent of the polymer particles is only about 22% of the total fluid. Higher viscosity changes can be obtained by increasing the concentration of the particles in the system. The results shown in Table 6 indicate that with crosslinked PMMA particles, the method of addition of acrylic acid does not have much effect on the performance behavior of the ER fluid. The general performance trends of the fluids neutralized with butyl lithium are similar to those of unneutralized PMMA-PAA fluids in that increases in the amount of PAA enhances the ER performance and at any given PAA level there is an optimum in performance with increasing dopant level.

Tables 3 and 4 show the sensitivity of the viscosity of the ER fluids to changes in temperatures. A change in the temperature from −25° C. causes a more than 1000-fold change in the viscosity of mineral oil. A typical PMMA-LiPAA fluid made in the same mineral oil continuous phase liquid showed a 100-fold change in the viscosity over the same temperature range. The viscosity profiles of the energized fluid are still flatter compared with that of the fluid at zero-field. The ratio of the energized viscosity to the zero-field viscosity, however, goes through an optimum over this temperature range and this optimum seems to be dependent upon the applied field. The diminishing response at both ends of the temperature range is due to very high and very low viscosity of the fluid at zero-field. With the PMMA-LiPAA/water doped ER fluid it has been determined that response is reversible upon returning the fluid to room temperature, indicating no permanent loss of water. The data shown in Table 5 indicate very little change in the response with increasing heat treatment for up to 16 hours. In this case the water present in the system is not free water which can be frozen and evaporated out of the system by cooling and heating. The lower performance at low temperature is mainly due to increased zero-field viscosity. The reason for lower response at high temperature is not clear but it may be related to increases in conductivity of the system with increasing temperature.

The data for current density for the above fluid as a function of applied field strength are given in Table 4. The current densities of this fluid are extremely low at room temperature. As the temperature increases, current densities increase. For example, the current density at 80° C. is about 1500 times the current density at room temperature for a 1 KV/mm applied field. Even though the current densities at high temperatures are several orders of magnitude higher than those at room temperature, they are still well within the acceptable range for many of the intended applications.

The stability of the ER fluids neutralized with butyl lithium was found to be excellent with no phase separation seen upon standing for several months. However, the stability was slightly less than an ethanol doped PMMA dispersion prepared according to Example 1 which has not been hydrophilically modified.

Table 7 provides the results for various dopants which were tested in addition to water. Dimethyl sulfoxide, N-methyl formamide, ethylene glycol, and ethanol were tested. None of these were effective dopants. Insignificant ER responses were produced in each case. N-methyl formamide and ethylene glycol seemed to swell the particles and facilitate interparticle bridging, thereby increasing the zero-field viscosity by several factors. Dimethyl sulfoxide and ethanol, which are not solvents for PAA, did not have any effect on the zero-field viscosity of the fluids.

In Table 8 the ER performance of fluids at various levels of water can be seen. At a level of about 2% water, the fluid became very thick. In measuring the response of the fluid with 1.5 and 2.0% water a problem with current overload was encountered.

The ER response of these fluids is comparable to state of the art fluids made from silica gel in silicone oil with about 50% higher solids than fluids of this invention. In addition, the fluids prepared in accordance with this invention are much superior in their current densities and stability than the prior art fluids.

EXAMPLES 9 to 13

Examples 9 and 10 describe fluids made by dilution of the ER fluids of Example 1B to reduce the zero-field viscosity. Examples 11 to 13 show the manufacture of the polymer particles in various media followed by dilution. The various diluents used and their physical properties are given in Table 9. The diluted fluids are made through mixture of the fluids of Example 1B with the appropriate diluent in the ratio shown in Tables 9A and Table 10. The diluted ER fluids showed an irreproducible performance at field strengths lower than 1 KV/mm, but at higher field strengths, the performance was quite stable and reproducible. The performance of these electrorheological fluids is shown in Table 9A. The lowest viscosity fluid was a halocarbon oil (a low molecular weight polymer of chlorotrifluoroethylene obtained from Halocarbon Products Corp., Hackensack, N.J.) diluted fluid at 1:2 volume ratio of dispersion to diluent. The initial zero-field viscosity of this fluid was about 5 centipoise which at 3 KV/mm showed an 800 fold increase in viscosity to 40 poise. On the other hand, a sample made by 1:1 volume ratio of dispersion to diluent had an initial zero-field viscosity of 16 centipoise with a 375 fold increase in viscosity at 3 KV/mm applied field. Fluids made with Isopar M, 1 cSt silicone oil and 3 cSt silicone oil as diluents, at 1:1 volume ratio of dispersion to diluent, ranged in the initial zero-field viscosities of 30 to 60 centipoise. The changes in the viscosities upon application of the electrical field were 300-fold at 2.5 KV/mm for Isopar M diluted fluid and about 50 to 60-fold for silicone oil diluted fluids at 1 KV/mm field strength. The composition of these fluids on a weight basis is given in Table 9. All of the dilutions were made based on volume, and therefore each fluid should have the same composition based on volume. However, the density of these diluents is not the same and therefore the compositions based on weight are not identical.

TABLE 9

Properties of the Diluents used For Making Low Viscosity ER Fluids

| | Diluents | Viscosity @ RT | Density gm/cc |
|---|---|---|---|
| (1) | Halocarbon 1.8* | 1.8 cSt** | 1.85 |
| (2) | Isopar M | 3.46 cST | 0.78 |
| (3) | Silicone Oil | 1.00 cSt | 0.82 |
| | | 3.0 cSt | 0.90 |
| | | 10.0 cST | 0.94 |
| | Mineral Oil | 90 cp | 0.87 |

*Low molecular weight polymers of chlorotrifluoroethylene obtained from Halocarbon Products Corp., Hackensack, New Jersey.
**@ 37.8° C.

These examples demonstrate that it is possible to make very low viscosity zero-field ER fluids by using a low viscosity continuous phase medium and low levels of dispersed phase particles. At higher field strengths these fluids do form a stable structure and thus give reproducible and stable ER response. ER fluids with higher solids content but lower zero-field viscosities are more desirable than those with lower solids, as the maximum strength of the fluid will be much higher than for fluids containing lower levels of solids. However, the higher solids fluids with lower zero field viscosity can only be made by increasing the particle size which in turn will have poor stability. These low viscosity and low solids fluids may be used in only very specialized applications requiring very low zero-field viscosity and relatively low ER response.

In preparing ER fluids by polymerization in lower viscosity medium, three different types of continuous phase liquids were used for dispersion polymerization including Isopar M, 1:1 mineral oil: Isopar M and 1:1 silicone oil: mineral oil. The polymerization procedure was essentially the same as that described in Examples 1-1B. The methyl methacrylate polymerization in some examples was carried out at the 40% level followed by dilution to 20% for acrylic acid polymerization. In other cases, MMA polymerization was itself carried out at a 20% solids level followed by AA polymerization without further dilution. In the polymerization runs made with 20% MMA, acrylic acid polymerization was carried out by feeding in the monomer containing the initiator and the crosslinking agent after allowing a two hour period for MMA to polymerize.

TABLE 9A

ER Performance of Lower Viscosity Fluids Made by Dilution

| Example No. | Diluent | Ratio of Dispersion to Diluent | Initial (Poise) Zerofield Viscosity | Field Strength KV/mm | Viscosity (Poise) 1 | 2 | 3 |
|---|---|---|---|---|---|---|---|
| 9A | Halocarbon 1.8 | 1:2 | 0.05 | | 10 | 23 | 40 |
| 9B | Halocarbon 1.8 | 1:1 | 0.16 | | — | — | 60 |
| 9C | Isopar M | 1:1 | 0.30 | | 2.5 | 47 | 90[a] |
| 9D | 1 cSt Silicone oil | 1:1 | 0.28 | | 17 | — | — |
| 9E | 3 cST Silicone oil | 1:1 | 0.62 | | 30 | — | — |

[a] @ 2.5 KV/mm

TABLE 10

Composition of the Diluted Fluids of Table 9A

| Example No. | Diluent | Dispersion/ Diluent | Composition (wt %) PMMA | LiPAA | H$_2$O | Rest. |
|---|---|---|---|---|---|---|
| 10A | Halocarbon 1.8 | 1:2 (v/v) | 3.84 | 0.66 | 0.2 | 95.3 |
| 10B | Halocarbon 1.8 | 1:1 (v/v) | 6.4 | 1.1 | 0.33 | 92.17 |
| 10C | Isopar M | 1:1 (v/v) | 10.3 | 1.76 | 0.54 | 87.44 |
| 10D | 1 cSt Silicone oil | 1:1 (v/v) | 10.1 | 1.7 | 0.5 | 87.7 |
| 10E | 3 cSt Silicone oil | 1:1 (v/v) | 9.6 | 1.65 | 0.5 | 88.25 |

The performance behavior and the composition of the fluids made in Isopar M as the continuous phase is shown in Table 11. Both crosslinked and non-crosslinked poly(methylmethacrylate) particles were used as base hydrophobic particles. Methyl methacrylate polymerization, using a procedure similar to Example 1, in each one of these fluids was carried out at the 40% level. The resulting dispersion was diluted with fresh continuous medium at a 1:1 ratio of dispersion:diluent. This diluted dispersion was used for hydrophilic modification with acrylic acid polymer. Acrylic acid polymerization to form the hydrophilic shell or globule around the polymer particles was also carried out both with and without crosslinking agent in it. Some samples, as shown in Tables 11 through 13 were neutralized with butyl lithium according to the procedure of Example 1B. The performance behavior of these fluids at low field strengths showed a somewhat unstable and irreproducible response. However, performance is more consistent at higher field strengths.

polymerizing methyl methacrylate at the 40% level in mineral oil: Isopar M mixture, then diluting to 20% polymer with the same continuous phase before acrylic acid polymerization of the hydrophilic shell or globule followed by neutralization with butyl lithium. The fluid made with this dispersion at 1% dopant (water) showed very good performance. However, the zero-field viscosity was not as low as desired. The higher zero-field viscosity was the result of the use of higher viscosity mineral oil. Although a higher viscosity mineral oil contributes its higher viscosity, this mineral oil is useful in improving the stability of the dispersion. However, the stability of the mixed continuous phase dispersion was inferior to those of Example 1B in which mineral oil was the only component in the continuous phase. However, through selection of the appropriate stabilizer, a stable fluid can be made with the continuous phase of Example 12. Examples 1–13 herein are made only with Acryloid 956 as the stabilizer. The data in Table 13 shows the performance behavior of the fluids made in a

TABLE 11

Performance of ER Fluids Made in Isopar M

| Example No. | Composition (%) PMMA | PAA/LiPAA | H$_2$O | Rest | Field Strength KV/mm | Viscosity (Poise) 0.0 | 0.125 | 0.25 | 0.5 | 0.75 | 1.0 |
|---|---|---|---|---|---|---|---|---|---|---|---|
| 11A | 19.0[a] | 3.0[c] | 1.0 | 77.0 | 0.09 | 21.6 | 88 | 180 | — | — | |
| 11B | 18.8[a] | 3.9[d] | 1.0 | 76.3 | 0.7 | 2 | — | — | — | — | |
| 11C | 19.0[b] | 3.1[e] | 1.0 | 76.9 | 0.1 | — | — | 1.4 | 9 | 18 | |
| 11D | 19.0[b] | 3.1[c] | 1.0 | 76.9 | 0.1 | — | — | 24 | 80 | 100 | |
| 11E | 18.8[b] | 4.0[f] | 1.0 | 76.2 | 0.4 | — | 0.4 | 1.2 | 1.5 | — | |
| 11F | 18.8[b] | 4.0[d] | 1.0 | 76.2 | 0.5 | — | — | 7 | 10 | — | |

[a] crosslinked PMMA.
[b] non-crosslinked PMMA.
[c] crosslinked PAA
[d] crosslinked LiPAA.
[e] non-crosslinked PAA.
[f] non-crosslinked LiPAA
MMA polymerization @ about 40% solids.
AA polymerization @ about 20% solids.

Table 12 gives the summary of the performance behavior of the fluids made with equal parts mineral oil and Isopar M as the continuous phase for polymerization. The first four samples in this table were made by 1:1 mixture of mineral oil and silicone oil. The performance of these fluids is similar to those made in the mineral oil-Isopar M continuous phase.

TABLE 12

Performance of ER Fluid Made in 50:50 Mineral Oil:Isopar M

| Example No. | Fluid Composition % | | | | Field Strength KV/mm | Viscosity (Poise) | | | | |
|---|---|---|---|---|---|---|---|---|---|---|
| | PMMA | Li PAA | H₂O | Rest | | 0.0 | 0.25 | 0.5 | 0.75 | 1.0 |
| 12A | 19.4 | 3.2 | 0 | 77.4 | | 1.7 | — | — | — | 1.7 |
| 12B | 19.4 | 3.2 | 0.25 | 77.15 | | 1.2 | 2.1 | 3.0 | 4.0 | 5.0 |
| 12C | 19.4 | 3.2 | 1.00 | 76.4 | | 3.9 | 5.5 | 175 | 300 | 420 |
| 12D | 20.6 | 4.0$^{(a)}$ | 1.00 | 74.6 | | 10.0 | 32 | 240 | 450 | 570 |
| 12E | 20.3 | 4.5 | 1.00 | 78.2 | | 5.7 | 23 | 100 | 180 | 327 |

$^{(a)}$partially neutralized fluid, 1.7% PAA, 2.3% LiPAA.
Example No. 12A–12C: MMA polymerization @ 40% solid, AA polymerization @ 20%, composition only approximate.
Example 12D–12E: MMA & AA polymerization @ 20% solids.

TABLE 13

Performance of ER Fluid Made in 50:50 Mineral Oil:Silicone Oil

| Example No. | Fluid Composition % | | | | Field Strength KV/mm | Viscosity (Poise) | | | | |
|---|---|---|---|---|---|---|---|---|---|---|
| | PMMA | Li PAA | H₂O | Rest | | 0.0 | 0.25 | 0.50 | 0.75 | 1.0 |
| 13A | 19.3 | 3.7$^{(a)}$ | 1.0 | 76.0 | | 6.3 | 53 | 360 | 580 | overload |
| 13B | 19.2 | 4.3 | 1.0 | 75.5 | | 3.8 | 22 | 100 | 270 | 450 |
| 13C | 19.2 | 4.3 | 1.0 | 75.5 | | 4.9 | 23 | 25 | 36 | — |

$^{(a)}$Partially neutralized fluid 1.6% PAA, 2.1% LiPAA.
Both MMA and AA polymerization @ 20% solid.

The data in Examples 11–13 shows that ER fluids with lower zero-field viscosity can be made in lower viscosity continuous phase mediums. The overall performance of the low zero-field viscosity fluids produced according to this invention is only stable at field strengths greater than 1 KV/mm with more than a 100 fold increase from zero-field viscosity observed at 1 KV/mm field strength. However, with selection of the appropriate continuous phase medium and stabilizer, low viscosity, low solids fluids should exhibit stable behavior at low field strengths.

EXAMPLES 14A and 14B

The polymethyl methacrylate dispersions of Example 1 were used as starting hydrophobic seed particles. These polymers were crosslinked using triethylene glycol dimethacrylate (TEGDMA) as a crosslinking agent.

The hydrophilic shell or globule was formed by polymerization of 2-sulfoethyl methacrylate. The procedure used for this polymerization was as follows: 125 grams of mineral oil and 3 grams of 2-sulfoethyl-methacrylate monomer were added to a glass bottle containing 125 grams of the dispersion of Example 1. This mixture was allowed to equilibrate for 24 hours. Then the mixture was transferred to a jacketed glass reactor equipped with a stirrer, thermometer, condenser and nitrogen sparging tube and heated to the polymerization temperature while stirring. Then 4.7 grams (5 ml) of MMA containing 0.3 grams of benzoyl peroxide and 0.2 grams of TEGDMA was slowly fed to the reactor over 30 minutes through an additional funnel attached to the reactor. The product was discharged after allowing it to polymerize overnight.

The performance of the ER fluids of Examples 14A and 14B which were made according to the above procedure is shown in Table 14. The fluid of Example 14A was doped by adding 0.4 grams of water to 40 grams of the fluid. The fluid of Example 14B was prepared by first neutralizing the acid groups using 10 Molar butyl lithium followed by doping with water in the same proportion as in Example 14A.

TABLE 14

PERFORMANCE OF PMMA-2-SULFOETHYL METHACRYLATE BASED FLUID

| EXAMPLE # | FIELD STRENGTH KV/mm | VISCOSITY (POISE) | | | |
|---|---|---|---|---|---|
| | | 0.0 | 0.25 | 0.5 | 1.0 |
| 14A | | 1.7 | 75 | — | — |
| 14B | | 14 | 40 | 175 | 320 |

Fluid composition PMMA = 20.8%
2-Sulfoethyl methacrylate = 1.2%
H₂O = 1.0%
Rest = 77.0%

EXAMPLE 15A

In Example 15A the dispersion polymerization of styrene was carried out according to essentially the same procedure as the methyl methacrylate procedure described in Example 1. This polymerization was also conducted with mineral oil as the continuous phase liquid using the ingredients shown in Table 15A. However, two substitutions were made: Ricon 100, a commercial copolymer of butadiene-styrene manufactured by Colorado Chemical Specialties, Inc. was used as the stabilizer instead of Acryloid 956 and divinyl benzene was used as the crosslinking agent. The particle size of the polystyrene dispersions was very broad compared to PMMA dispersions. The particle size ranged from 0.5 micron to about 30 microns in diameter. Consequently, the stability of these dispersions was less than that of the PMMA dispersions. The stability can be improved by optimization of the proportion of stabilizer and through the choice of the stabilizer polymer.

EXAMPLE 15B

The same concept and experimental procedure was followed as in Example 1A. Acrylic acid containing dissolved initiator (benzoyl peroxide, BP) and crosslinking agent (triethylene glycol dimethacrylate, TEGDMA) was fed to the polystyrene dispersion maintained in an inert atmosphere at polymerization temperature (80° C.) over a one hour period. Acrylic acid polymerization was carried out either at 40% solids or after dilution to 20% solids using mineral oil diluent. A typical list of ingredients is shown in Table 15B.

EXAMPLE 15C

The polystyrene - polyacrylic acid fluids of Example 15B were further improved by neutralizing the carboxylic groups. The groups were neutralized by direct addition of stoichiometric amounts of 10M butyl lithium as in Example 1B. The neutralization reaction was carried out under argon atmosphere. Extreme care was exercised during transfers of butyl lithium. A typical list of ingredients is given in Table 15C.

EXAMPLES 15D and 15E

The performance data of neutralized polystyrene-polyacrylic acid fluids is given in Table 15. These fluids were prepared according to the recipes in Tables 15D and 15E and the basic procedure of Example 1B. The performance measurements were carried on the Rheometrics Mechanical Spectrometer.

TABLE 15

PERFORMANCE OF STYRENE BASED ER FLUIDS[a]

| EXAMPLE NO. | FIELD STRENGTH KV/mm | Viscosity (Poise) | | | |
|---|---|---|---|---|---|
| | | 0.0 | 0.5 | 1.0 | 1.5 |
| 15D[b] | | 3.5 | 147 | 385 | 645 |
| 15E[c] | | 1.1 | 120 | — | — |

[a] Measurements on RMS
[b] Fluid Composition
Polystyrene: 28.2%
LiPAA: 3.8%
H$_2$O: 1.5%
Rest: 66.5%
[c] Fluid Composition
Polystyrene 18.9%
LiPAA: 2.6%
H$_2$O: 1.0%
Rest: 77.5%

TABLE 15A

| | | Parts/100 |
|---|---|---|
| Mineral Oil | 261.0 gm (300 ml) | 57.88 |
| Stabilizer, Ricon 100* | 5.0 gms | 1.11 |
| Styrene Monomer | 187.0 gm (200 ml) | 40.31 |
| Benzoyl Peroxide | 2.5 gm | 0.55 |
| Crosslinking Agent, Divinyl Benzene (DVB) | 0.66 gm | 0.15 |
| Total | 450.96 gm | 100.00 |

*Product by Colorado Chemical Specialties Inc.

TABLE 15B

| Polystyrene Dispersion of Table 15A = 500 gms | |
|---|---|
| Acrylic Acid | 21 gm (20 ml) |
| Benzoyl Peroxide | 0.4 gm |
| Crosslinking Agent TEGDMA | 0.14 mg |
| Total | 521.54 gms |

TABLE 15C

| Dispersion of Table 15B = | 600 gms |
|---|---|
| 10M Butyl Lithium = | 34 ml |

TABLE 15D

| Dispersion of Table 15C = | 300 gm |
|---|---|
| Mineral Oil = | 100 gm |
| H$_2$O = | 2 gm |

TABLE 15E

| Dispersion of Table 15C = | 80 gms |
|---|---|
| Halocarbon 1.8 = | 80 gms |
| H$_2$O = | 1.6 gms |

I claim:

1. An electrorheological fluid comprising a dispersion of a non-polar electrically insulating liquid of polymer particles consisting essentially of a hydrophobic polymer core and a neutralized hydrophilic polymer shell around said core, said polymer particles containing a polar liquid.

2. The electrorheological fluid of claim 1 wherein the hydrophobic polymer core of said polymer particles has first been polymerized in said electrically insulating liquid from a hydrophobic monomer that is soluble in said liquid, followed by addition of a hydrophilic monomer to said dispersion, said hydrophilic monomer polymerizing to form a hydrophilic polymer shell around said hydrophobic polymer core, followed by addition of stoichiometric amounts of a neutralizing agent to said dispersion, followed by addition of said polar liquid.

3. The electrorheological fluid of claim 2 further comprising a steric stabilizer polymer, wherein said steric stabilizer polymer is a homopolymer, or a copolymer selected from the group consisting of random copolymers, block copolymers and graft copolymers wherein in said copolymers one segment of the copolymer is soluble in said electrically insulating liquid and a second segment of the copolymer has an affinity to said polar liquid-containing solid phase.

4. The electrorheological fluid of claim 3 wherein said steric stabilizer polymer is a homopolymer selected from the group consisting of poly(methyl methacrylate), poly(vinyl acetate), poly(12-hydroxystearic acid) and poly(lauryl methacrylate).

5. The electrorheological fluid of claim 2 wherein said electrically insulating liquid is a hydrophobic liquid selected from the group consisting of mineral oils, silicone oils, halogenated aromatic liquids and halogenated paraffins and mixtures thereof.

6. The electrorheological fluid of claim 2 wherein said polar liquid is water.

7. The electrorheological fluid of claim 2 wherein said hydrophobic monomer is selected from the group consisting of acrylates, methacrylates, styrenes, vinyl acetate, vinyl chlorides and acrylonitriles.

8. The electrorheological fluid of claim 7 wherein said hydrophobic monomer is selected from the group consisting of ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, decyl acrylate, isodecyl methacrylate, lauryl acrylate, stearyl acrylate, behenyl acrylate, myristyl acrylate, styrene, alpha-methyl styrene and vinyl toluene.

9. The electrorheological fluid of claim 8 wherein said hydrophobic monomer is methyl methacrylate.

10. The electrorheological fluid of claim 8 wherein said hydrophobic monomer is styrene.

11. The electrorheological fluid of claim 2 wherein said hydrophilic monomer is a carboxyl-containing or a sulfate or sulfonate-containing monomer wherein said carboxyl-containing monomer is selected from the group consisting of acrylic acid, methacrylic acid, itaconic acid, aconitic acid, fumaric acid, maleic acid and wherein said sulfonate-containing monomer is selected from the group consisting of 2-sulfoethyl acrylate, 2-sulfoethyl methacrylate, p-vinylbenzene sulfonate, vinylbenzyl sulfonate and vinyl sulfonate.

12. The electrorheological fluid of claim 11 wherein said hydrophilic monomer is selected from the group consisting of acrylic acid, methacrylic acid and 2-sulfoethyl methacrylate.

13. The electrorheological fluid of claim 2 wherein said polymer comprises particles having a diameter in the range from about 0.1 to about 10 microns in diameter.

14. The electrorheological fluid of claim 2 wherein said neutralizing agent is an organic soluble base selected from the group consisting of alkyl and aryl compounds of lithium, aluminum, zinc, magnesium, boron, sodium, and Potassium; lithium tertbutoxide, potassium tertbutoxide, sodium 2-ethyl hexoxide; octadecyl amine, 2-ethyl hexylamine and pyridine; and dialkyl magnesium, benzyl trimethyl ammonium hydroxide and tetrabutyl ammonium hydroxide.

15. The electrorheological fluid of claim 14 wherein said neutralizing agent is butyl lithium.

16. A method of preparing a fluid which exhibits electrorheological properties at low current densities comprising:

admixing a solid phase into a non-polar electrically insulating liquid, said solid phase consisting essentially of polymer particles, wherein said polymer has been polymerized in said liquid from a hydrophobic monomer that is soluble in said liquid and wherein a hydrophilic monomer is then added to said dispersion, said hydrophilic monomer polymerizing to form a hydrophilic polymer shell around said polymer particles, followed by addition of stoichiometric amounts of a neutralizing agent followed by addition of a polar liquid.

17. The method of claim 16 further comprising admixing a steric stabilizer polymer, wherein said polymer is selected from the group consisting of homopolymers and random copolymers, block copolymers and graft copolymers of two polymers wherein in said copolymers one segment, of the copolymer is soluble in said electrically insulating liquid and a second segment of the copolymer has an affinity to said polar liquid-containing solid phase.

18. The method of claim 17 wherein said steric stabilizer polymer is a homopolymer selected from the group consisting of poly(methyl methacrylate), poly(vinyl acetate), poly(12 hydroxystearic acid) and poly(lauryl methacrylate).

19. The method of claim 16 wherein said electrically insulating liquid is a hydrophobic liquid selected from the group consisting of mineral oil, silicone oils, halogenated aromatic liquids and halogenated paraffins and mixtures thereof.

20. The method of claim 16 wherein said polar liquid is water.

21. The method of claim 16 wherein said hydrophobic monomer is selected from the group consisting of acrylates, methacrylates, styrenes, vinyl acetate, vinyl chlorides and acrylonitriles.

22. The method of claim 21 wherein said hydrophobic monomer is selected from the group consisting of ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, decyl acrylate, isodecyl methacrylate, lauryl acrylate, stearyl acrylate, behenyl acrylate, myristyl acrylate, styrene, alpha-methylstyrene, and vinyl toluene.

23. The method of claim 22 wherein said hydrophobic monomer is methyl methacrylate.

24. The method of claim 22 wherein said hydrophobic monomer is styrene.

25. The method of claim 16 wherein said hydrophilic monomer is a carboxyl-containing or a sulfate or sulfonate-containing monomer wherein said carboxyl-containing monomer is selected from the group consisting of acrylic acid, methacrylic acid, itaconic acid, aconitic acid, fumaric acid, maleic acid and wherein said sulfonate-containing monomer is selected from the group consisting of 2-sulfoethyl acrylate, 2-sulfoethyl methacrylate, p-vinylbenzene sulfonate, vinylbenzyl sulfonate and vinyl sulfonate.

26. The method of claim 25 wherein said hydrophilic monomer is selected from the group consisting of acrylic acid, methacrylic acid and 2-sulfoethyl methacrylate.

27. The method of claim 16 wherein said polymer particles have a diameter in the range from about 0.1 to about 10 microns in diameter.

28. The method of claim 16 wherein said neutralizing agent is an organic soluble base selected from the group consisting of alkyl and aryl compounds of lithium, aluminum, zinc, magnesium, boron, sodium, and potassium; lithium tertbutoxide, potassium tertbutoxide, sodium 2-ethyl hexoxide; octadecyl amine, 2-ethyl hexylamine and pyridine; and dialkyl magnesium, benzyl trimethyl ammonium hydroxide and tetrabutyl ammonium hydroxide.

29. The method of claim 28 wherein said neutralizing agent is butyl lithium.

* * * * *

UNITED STATES PATENT AND TRADEMARK OFFICE
CERTIFICATE OF CORRECTION

PATENT NO. : 4,992,192

DATED : February 12, 1991

INVENTOR(S) : Syed M. Ahmed

It is certified that error appears in the above-identified patent and that said Letters Patent is hereby corrected as shown below:

Col. 6, line 68, after "facilitate" insert --the application of a DC potential across a 2 mm gap. The --;

Col. 10, line 16, "Example b 1" should read -- Example 1 --;

Col. 14, line 47, after "-25°C." insert -- to 100°C. --;

In the Claims, Col. 22, line 9 "of a" should read -- in a --;

In the Claims, Col. 23, line 18, "Potassium" should read -- potassium --;

In the Claims, Col. 23, line 44, "segment, of" should read -- segment of --; and Signed and Sealed this Fifth Day of January, 1993

*Attest:*

DOUGLAS B. COMER

*Attesting Officer*   *Acting Commissioner of Patents and Trademarks*